(12) United States Patent
Anand

(10) Patent No.: US 9,800,684 B2
(45) Date of Patent: Oct. 24, 2017

(54) SYSTEMS AND METHODS FOR STATISTICAL CACHING

(71) Applicant: Prevoty, Inc., Los Angeles, CA (US)

(72) Inventor: Kunal Anand, San Jose, CA (US)

(73) Assignee: Prevoty, Inc., Los Angeles, CA (US)

( * ) Notice: Subject to any disclaimer, the term of this patent is extended or adjusted under 35 U.S.C. 154(b) by 3 days.

(21) Appl. No.: 14/599,975

(22) Filed: Jan. 19, 2015

(65) Prior Publication Data

US 2015/0207898 A1 Jul. 23, 2015

Related U.S. Application Data

(60) Provisional application No. 61/929,471, filed on Jan. 20, 2014, provisional application No. 61/929,471, filed on Jan. 20, 2014.

(51) Int. Cl.
*G06F 15/167* (2006.01)
*H04L 29/08* (2006.01)

(52) U.S. Cl.
CPC ...... *H04L 67/2852* (2013.01); *H04L 67/2842* (2013.01)

(58) Field of Classification Search
CPC .......................... H04L 67/2852; H04L 67/2842
USPC ......................................................... 709/212
See application file for complete search history.

(56) References Cited

U.S. PATENT DOCUMENTS

| 8,045,713 B2* | 10/2011 | Lain ...................... H04L 9/0836 380/259 |
| 2010/0031165 A1* | 2/2010 | Lindquist ................ H04L 12/66 715/757 |
| 2010/0082903 A1* | 4/2010 | Kurashige ........... G06F 12/0246 711/118 |
| 2010/0094945 A1* | 4/2010 | Chan .................. H04L 67/2819 709/206 |
| 2012/0124010 A1 | 5/2012 | Cha et al. |
| 2013/0297880 A1* | 11/2013 | Flynn ..................... G06F 1/183 711/128 |

OTHER PUBLICATIONS

USPTO, ISA/US, "Notification of Transmittal of the ISR and the Written Opinion of the International Searching Authority, or the Declaration," in PCT Application No. PCT/US2015/012078, May 13, 2015, 7 pages.

\* cited by examiner

*Primary Examiner* — Sm Rahman
(74) *Attorney, Agent, or Firm* — Kang S. Lim

(57) ABSTRACT

The present invention relates to systems and methods for statistical caching. Inputs are captured via an appropriate network protocol. The input includes statistical data and a corresponding cache key. The values for each cache key within a cache are compacted using the input. The compacting involves determining if the corresponding cache key is already set within the cache, and if the cache key is present, aggregating the statistical data with the value stored within the cache to generate an updated value. The updated cache may be periodically synchronized with a final data store. Additionally, each operation performed by the statistical cache may be recorded in a transaction log for fault tolerance.

12 Claims, 5 Drawing Sheets

SYSTEMS AND METHODS FOR STATISTICAL CACHING

CROSS-REFERENCE TO RELATED APPLICATIONS

This non-provisional application claims the benefit of and is a continuation-in-part of U.S. provisional patent application No. 61/929,471, filed on Jan. 20, 2014, of same title, which application is hereby fully incorporated in its entirety by this reference.

BACKGROUND

The present invention relates to systems and methods for handling very large volumes of data inputs in a far more efficient manner than currently available. Traditionally, incoming data is processed sequentially in a First in First Out (FIFO) manner. When very large qualities of the inputs are present, the ability to handle the data is quickly eclipsed by the speed at which it accumulates. Currently, the inputs are simply stored for processing at a later time.

However, in some applications, there is a strong need to decrease processing time of these inputs. This can be accomplished, traditionally, by increasing processing and data storage capacity. However, in some applications, even with sizable resources available, merely scaling up the processing capability is insufficient to handling the sheer volume of inputs.

One area that exemplifies this issue of data handling difficulty is within online commerce. In this area, vast transaction inputs are handled routinely. Of course, the ability to handle inputs is not limited to online commerce, and extends to many areas of computing.

It is therefore apparent that an urgent need exists for systems and methods for more efficient handling of input data utilizing statistical caching. Such systems and methods enable faster and more robust event storage solutions.

SUMMARY

To achieve the foregoing and in accordance with the present invention, systems and methods for statistical caching are provided. Such systems and methods enable much larger numbers of events to be stored in a more efficient manner due to the ability for these events to aggregate statistical values, and periodically synchronize this cache with the persistent final storage location.

In some embodiments, inputs are captured via an appropriate network protocol. The appropriate network protocol is selected by desired throughput and data modeling. The input includes statistical data and a corresponding cache key. The cache key is a string and the value is a sequence of bytes.

The values for each cache key within a cache are compacted using the input. The compacting involves determining if the corresponding cache key is already set within the cache, and if the cache key is present, aggregating the statistical data with the value stored within the cache to generate an updated value.

The updated cache may be periodically synchronized with a final data store. Synchronization may occur after a set period of time, set number of inputs, or based upon other variables.

Additionally, the disclosed systems and methods may also record each operation performed by the statistical cache, in some embodiments, in a transaction log. Thus, in the event of a disruption, the cache may be regenerated by replaying the transaction log. This is to ensure fault tolerance.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

As previously noted, the disclosed systems and methods are applicable for any computing activity where event storage is required in an efficient manner. Storage may include databases, queues, log files and any other temporal or persistent data sinks. In some cases, the disclosed systems and methods are particularly helpful within online commerce settings; however, any situation where data is created and then stored could take advantage of the disclosed systems and methods.

Additionally, in some embodiments, the data being processed by the statistical cache may be in the clear, or may be encrypted (as long as decryption keys are available to the system).

Figure 1:
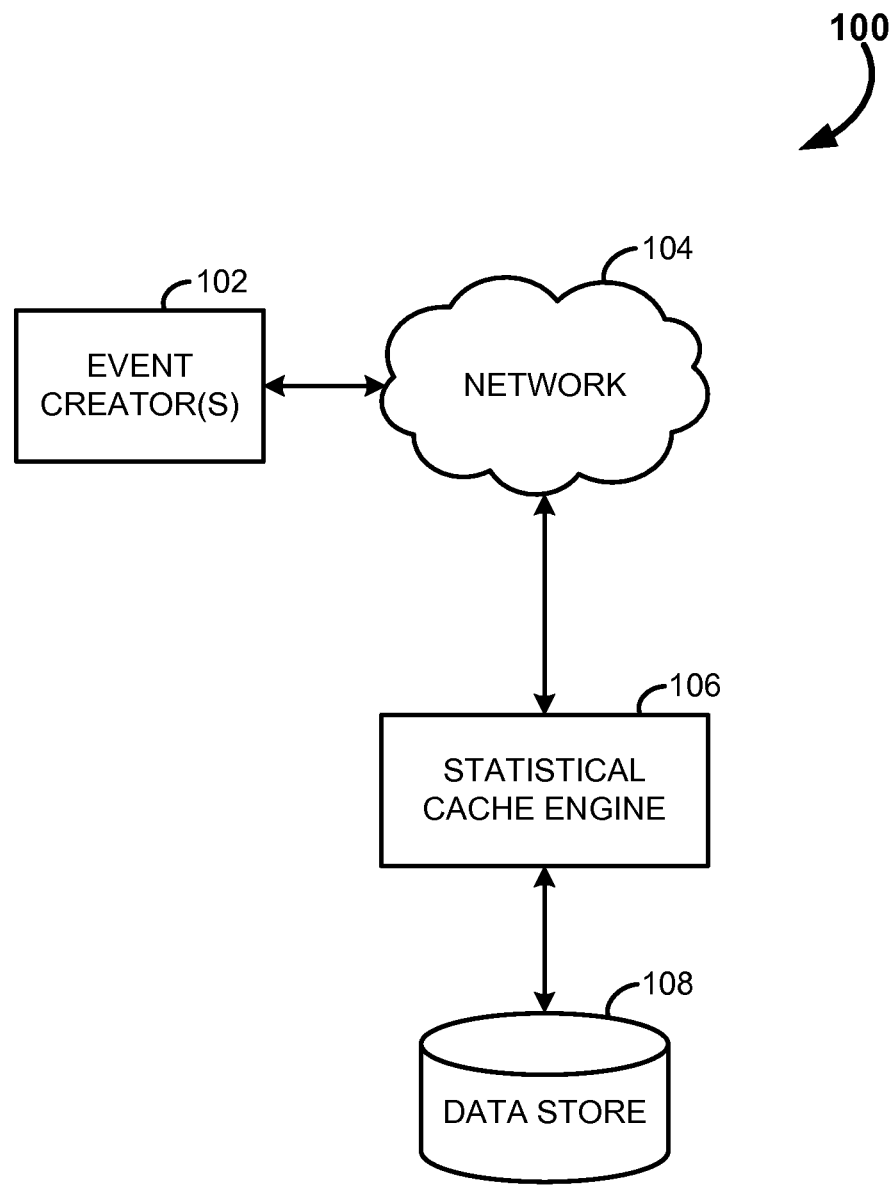
FIG. 1 is a schematic block diagram for the structure of a network which processes and synchronizes input information, in association with some embodiments.

Turning to FIG. 1, one or more event creators 102 generate events. These input events may be provided directly to the statistical cache engine 106, or may be provided to the cache engine 106 via a network 104. The network 104 may include any local or wide area network, such as a company intranet, the internet, ad hoc networks, etc.

In some embodiments, the statistical cache engine 106 may be accessible via TCP, UDP, HyperText Transfer Protocol (HTTP), or any other desirable protocol. The specific protocol utilized may be selected based upon desired throughput and data modeling.

Once the appropriate network protocol is selected, the statistical data of the event, along with a corresponding cache key is encoded in the relative wire format and presented to the statistical cache engine as bytes 106. The statistical cache engine 106 acts as an intermediate that aggregates inputs before storage into the data store 108.

Figure 2:
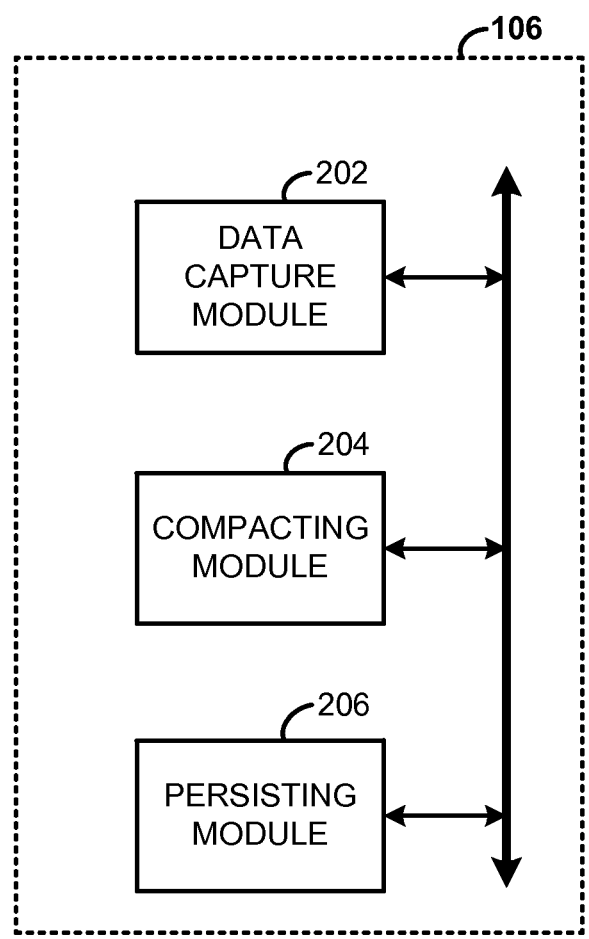
FIG. 2 is a schematic block diagram for a system which captures, compacts and persists input information to a final data store, in association with some embodiments.

Turning to FIG. 2, the statistical cache engine 106 includes a data capture module 202, a compacting module 204, and a persisting module 206, which may be physically or logically coupled together. The data capture module 202 is an agent that captures the bytes (input) via the appropriate network protocol.

The compacting module 204 compacts the values of each key, which is essential to the aggregation of values and results in the enhanced efficiencies realized by the present systems and methods. The internal memory for the statistical cache engine 106 is similar to other caches: value storage and retrieval is based on a cache key. The cache key is a literal identifier, which is a string. The value can be any sequence of byte-encoded data, including a JSON object with keys and values.

Data compaction, which will be described in considerable detail below, includes merging new data that has a pre-existing cache key into an aggregated statistic. However, if no such cache key exists, a new cache key can be generated for the input. In this manner all updates for a cache key may be aggregated prior to storing in the persistent dataset. In contrast, current systems re-write the storage for each input.

Periodically, the statistical data that is aggregated is stored in the final data store 108 by the persisting module 206. This activity may be referred to as synchronization, and may include raw value storage as well as time series data. Since the bulk of the data aggregation has already occurred within the statistical cache engine 106, the persisting module 206 needs to access the data store 108 far less often than current systems. Thus, data may be managed as it is received, rather than being deferred until the data store is prepared to accept additional insertions and/or updates.

Additionally, the persisting module 206 may maintain a journal of each operation that occurs within the statistical cache engine 106. This journal is essentially a transaction log which may be employed for review and auditing purposes. More significantly, however, is that in the event of a disruption, the transaction log can be replayed in order to recover the system. This added level of fault tolerance enables the statistical cache engine 106 to operate more robustly than any current caching methodologies.

The disclosed statistical cache engine 106 enables millions of requests to be processed per minute via compaction. In contrast, current systems utilize databases or queues that require inserting or updating the data store for each individual request.

Figure 3:
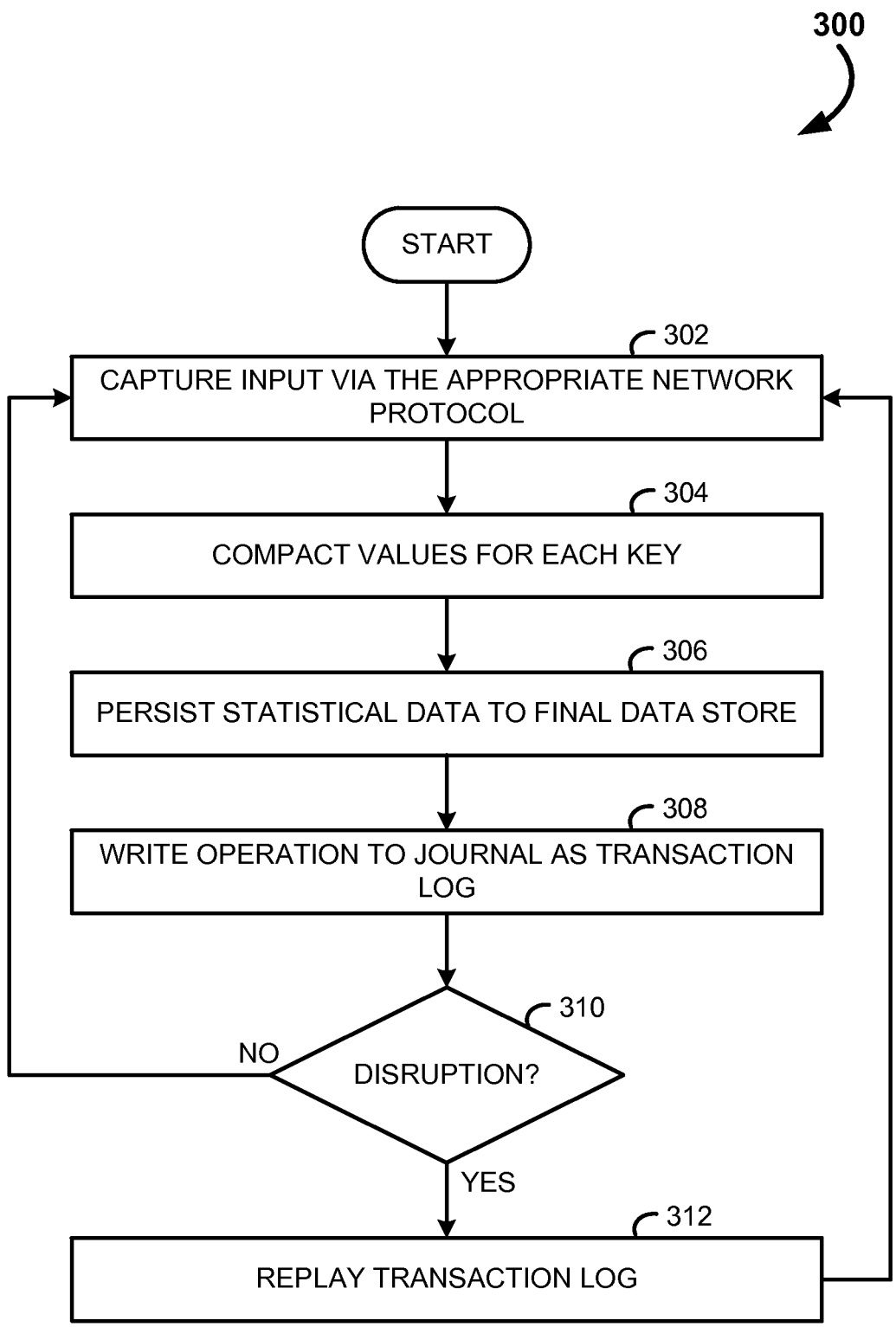
FIG. 3 is a more detailed schematic block diagram of the cache's fault-tolerant algorithm for capturing and persisting input information, in accordance with some embodiments.

Moving to FIG. 3, the process for statistical caching is provided in greater detail, shown generally at 300. In this example process, the input is captured via the appropriate network protocol (at 302). As previously discussed, the selection of the network protocol may be dependent upon throughput needs and data modeling.

Figure 4:
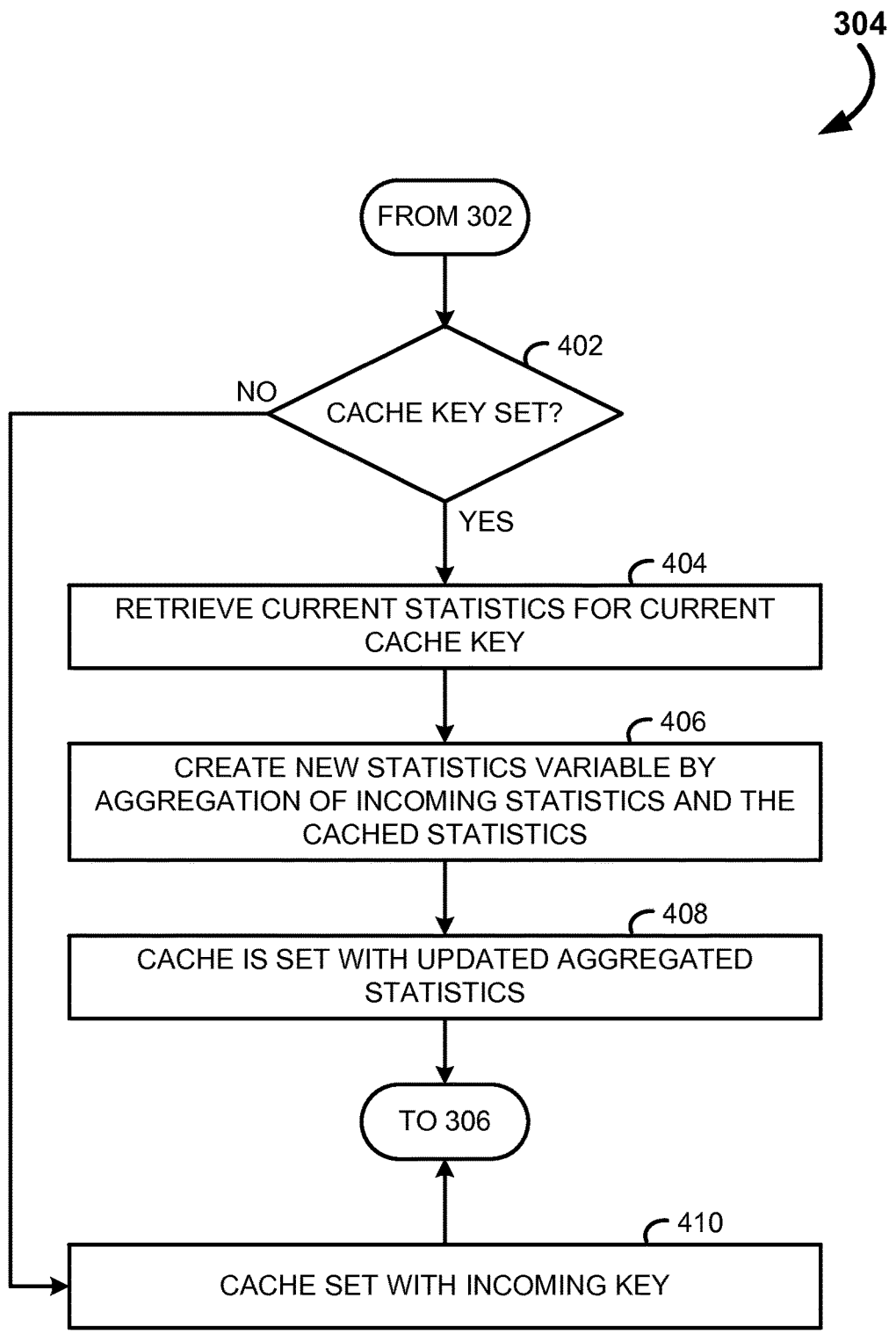
FIG. 4 is a more detailed schematic block diagram of the cache key compaction algorithm, in accordance with some embodiments.

After the data is captured, the values for each key are compacted (at 304). Key compaction occurs within the statistical cache to flatten and aggregate values associated with a given cache key. FIG. 4 provides a more detailed explanation of this compaction step, in accordance with some embodiments.

This compaction sub-process begins with a query as to whether the cache key for the incoming data is already set (at 402). As previously noted, the cache keys are literal identifiers typically comprised of a string. If a cache key is already set, the current statistics for that cache key are retrieved (at 404). Next, a new statistics variable is generated by aggregating the incoming statistics and the existing cached statistics that were retrieved (at 406). This aggregation compresses the cache with the new statistics to generate the updated values. The cache may then be set with the cache key identifying the updated statistic values (at 408). This updated cache may be stored across multiple nodes, in some embodiments.

In contrast, if no cache key already exists for the input (at 402), the system may simply set the cache with the incoming key (at 410). This cache key may be dependent upon the source of data. Regardless of whether a new cache key is set, or if aggregate statistics are stored, the process returns to FIG. 3, where the statistical data stored in the cache is persistently stored to the final data store (at 306).

This transferring of data from the cache to the final storage location may be referred to as 'synchronization'. Synchronization may be periodically scheduled according to a set time period, a set number of events being processed (i.e., ten million events that are processed, etc.), or a set number of cache data that has been altered from the last synchronization. Of course other synchronization triggers may also be envisioned (such as on-demand synchronization, or synchronization prior to another operation such as reporting). In some embodiments, synchronization includes raw value storage as well as time-series data.

In addition to the compacting of data, the present methods also contemplate the generation of a journal of all operations the statistical cache makes (at 308). This journal/transaction log provides a level of fault tolerance in the event of a service disruption (at 310). If such a disruption occurs, the transaction logs may be replayed in order to regenerate the cached dataset (at 312). Thus, even if a disruption occurs a significant time after a synchronization event, the data may be accurately generated for later persistent storage.

The presently disclosed methods continue by capturing another event input and repeating the process for as many input events as required. In this manner, the system and methods are capable of handling millions of events per minute without writing the transactions in a database or queue for individual re-write events to the final data store.

Figure 5A:
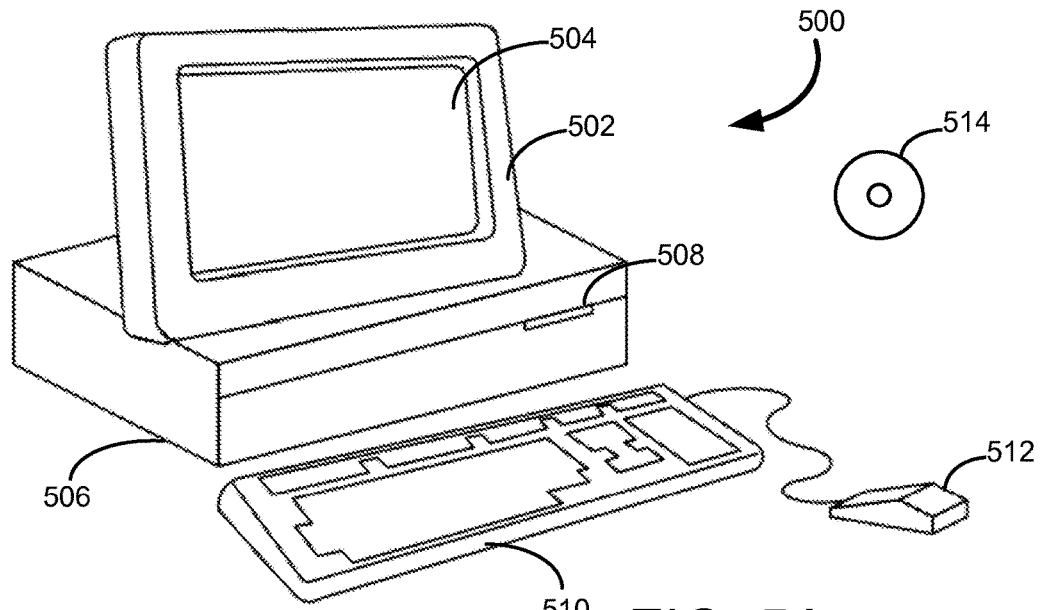
FIGS. 5A and 5B are example illustrations for computer systems configured capable of statistical caching, in accordance with some embodiments.
Figure 5B:
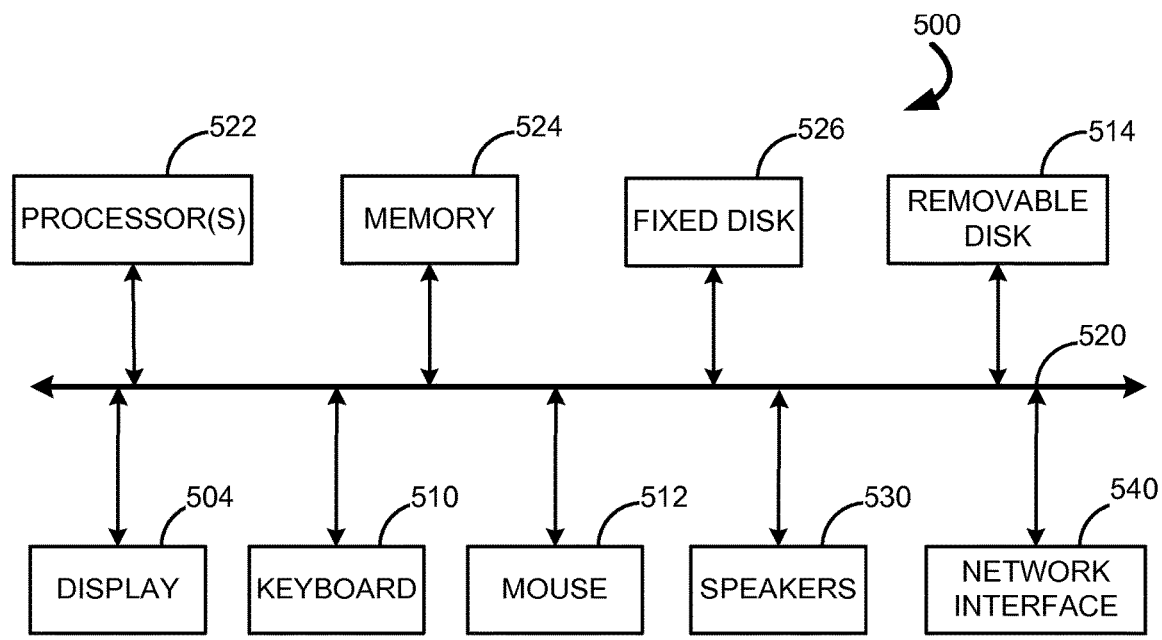

FIGS. 5A and 5B illustrate a Computer System 500, which is suitable for implementing embodiments of the present invention. FIG. 5A shows one possible physical form of the Computer System 500. Of course, the Computer System 500 may have many physical forms ranging from a printed circuit board, an integrated circuit, and a small handheld device up to a huge super computer. Computer system 500 may include a Monitor 502, a Display 504, a Housing 506, a Disk Drive 508, a Keyboard 510, and a Mouse 512. Disk 514 is a computer-readable medium used to transfer data to and from Computer System 500.

FIG. 5B is an example of a block diagram for Computer System 500. Attached to System Bus 520 are a wide variety of subsystems. Processor(s) 522 (also referred to as central processing units, or CPUs) are coupled to storage devices, including Memory 524. Memory 524 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 526 may also be coupled bi-directionally to the Processor 522; it provides additional data storage capacity and may also include any of the computer-readable media described below. Fixed Disk 526 may be used to store programs, data, and the like and is typically a secondary storage medium (such as a hard disk) that is slower than primary storage. It will be appreciated that the information retained within Fixed Disk 526 may, in appropriate cases, be incorporated in standard fashion as virtual memory in Memory 524. Removable Disk 514 may take the form of any of the computer-readable media described below.

Processor 522 is also coupled to a variety of input/output devices, such as Display 504, Keyboard 510, Mouse 512 and Speakers 530. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 522 optionally may be coupled to another computer or telecommunications network using Network Interface 540. With such a Network Interface 540, it is contemplated that the Processor 522 might receive information from the network, or might output information to the network in the course of performing the above-described statistical caching. Furthermore, method embodiments of the present invention may execute solely upon Processor 522 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

In sum, the present invention provides systems and methods for statistical caching of large numbers of input events. Such systems and methods enable much larger numbers of events to be stored in a more efficient manner due to the ability for these events to aggregate the new statistical values with currently cached values, and periodically synchronize this cache with the persistent final storage location. This enables fewer writes to the final storage location. A transaction log may likewise be employed to provide a degree of fault tolerance.

While various aspects and embodiments have been disclosed in the present invention, other aspects and embodiments will be apparent to those skilled in the art. The various aspects and embodiments disclosed herein are for purposes of illustration and are not intended to be limiting. The true scope and spirit are indicated by the following claims, along with the full scope of equivalents to which such claims are entitled. Furthermore, the terminology used herein is for the purpose of describing particular embodiments only and is not intended to be limiting in any way.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computer implemented method for statistical caching of input events to improve computer operation when receiving large numbers of inputs comprising:
   capturing a plurality of inputs via appropriate network protocols, wherein the inputs each have statistical data and a corresponding cache key:
   comparing the corresponding cache key for each of the captured plurality of inputs against stored keys;
   storing the statistical data of a first subset of inputs, with corresponding cache keys, to a cache memory when the corresponding cache key is not found in the stored keys;
   retrieving information already present within the cache memory and compacting the statistical data of a second subset of inputs, with corresponding cache keys, with the retrieved information already present within the cache memory to generate an aggregate statistical variable data when the corresponding cache key is found in the stored keys, and updating the stored keys identifying the aggregate statistical variable;
   synchronizing the cache memory with a final data store;
   recording each operation in a transaction log; and
   regenerating the cache by replaying the transaction log in the event of a disruption.

2. The method of claim 1, wherein the appropriate network protocol is selected by desired throughput and data modeling.

3. The method of claim 1, wherein the synchronization is periodic.

4. The method of claim 3, wherein the synchronization occurs after a set period of time.

5. The method of claim 3, wherein the synchronization occurs after a set number of inputs.

6. The method of claim 1, wherein the cache key is a string, and wherein the value is a sequence of bytes.

7. A statistical caching system for managing the storage of input events comprising:
- a data capture interface for capturing a plurality of inputs via appropriate network protocols, wherein the inputs each have statistical data and a corresponding cache key;
- a compacting module comprising a processor and a cache memory, configured to:
- compare the corresponding cache key for each of the captured plurality of inputs against stored keys;
- store the statistical data of a first subset of inputs, with corresponding cache keys, to a cache memory when the corresponding cache key is not found in the stored keys;
- retrieve information already present within the cache memory and compact the statistical data of a second subset of inputs, with corresponding cache keys, with the retrieved information already present within the cache memory to generate an aggregate statistical variable when the corresponding cache key is found in the stored keys, and updating the stored keys identifying the aggregate statistical variable;
- record each operation in a transaction log; and
- regenerate the cache by replaying the transaction log in the event of a disruption; and
- a persisting module comprising a processor and coupled to a bus for synchronizing the cache memory with a final data store.

8. The system of claim 7, wherein the data capture module selects an appropriate network protocol based upon desired throughput and data modeling.

9. The system of claim 7, wherein the persisting module performs the synchronization periodically.

10. The system of claim 9, wherein the persisting module performs the synchronization after a set period of time.

11. The system of claim 9, wherein the persisting module performs the synchronization after a set number of inputs.

12. The system of claim 7, wherein the cache key is a string, and wherein the value is a sequence of bytes.

* * * * *